(No Model.)
J. DEASEY.
FAUCET.
No. 358,021. Patented Feb. 22, 1887.
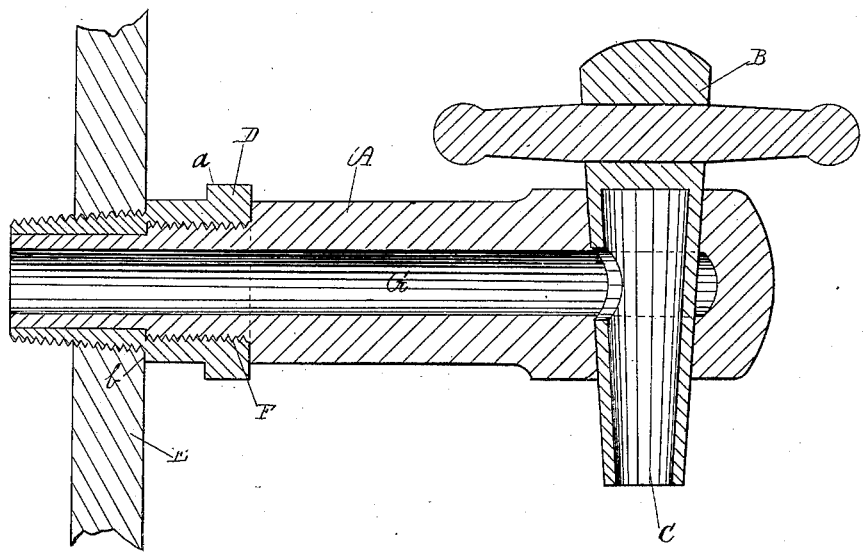
Witnesses.
Robert Wallace,
Milan F. Stevens.
Inventor.
John Deasey
by Wm. H. MacLeod
his atty

UNITED STATES PATENT OFFICE.

JOHN DEASEY, OF FALL RIVER, MASSACHUSETTS.

FAUCET.

SPECIFICATION forming part of Letters Patent No. 358,021, dated February 22, 1887.

Application filed September 23, 1886. Serial No. 214,315. (No model.)

*To all whom it may concern:*

Be it known that I, JOHN DEASEY, of Fall River, county of Bristol, State of Massachusetts, have invented certain new and useful Improvements in Faucets, of which the following is a specification, reference being had to the drawing accompanying and forming a part hereof, in which a lengthwise section of my improved faucet is shown as secured in a cask.

Faucets made of wood are now in common use for drawing still-liquors, as also acid liquors—as vinegar—from the casks or vessels in which they are stored. These wooden faucets are deemed preferable for this purpose, because they are inexpensive, and the liquor is not brought in contact with any metallic or other substance with which it may become tainted. Wooden faucets of the kind referred to are generally made with a tapering end, which is inserted into a hole in the cask bored for the purpose, and the faucet is driven snugly in, and is held by the friction of the tapering end in the hole. A faucet applied in this manner is objectionable in that it works loose frequently, because of the strain and pressure necessary in turning the faucet when it is opened and closed. This renders a faucet of this kind liable to come out of the cask at any time, and it is, primarily, the object of my present invention to produce a faucet which will be free from this objection.

My invention is simple; and it consists of a faucet having a wooden barrel or shank and a metallic tip secured thereto, and constructed in the manner hereinafter set forth.

The barrel or shank A in my faucet is of wood, and is provided in the usual manner with a central opening, G, for the passage of the liquor. The spigot or plug B, with its discharge-opening C, through which, when the faucet is open, the liquor flows, is of common construction, and does not require description. This end of the faucet may be of any shape desired, and may be provided with a plug of any desired construction.

The plug and construction shown in the drawing is the usual one in ordinary wooden faucets.

The end of the faucet-barrel which enters the cask I provide with a ferrule or tip, D, of metal, preferably of brass nickel-plated. The ferrule D is of the shape shown, and has a tapering end, the exterior of which is screw-threaded and adapted to be screwed into a hole made in the cask E. It is necessary that the faucet be screwed into the cask in order to secure the faucet firmly, since the sides of casks which contain still-liquors are comparatively thin, and will not securely hold a faucet which is merely wedged or driven in. Beside the conical-threaded end the ferrule D is provided with a body, the exterior of which is smooth, and one portion, $a$, of which is of slightly greater diameter, and is squared to receive a wrench for the purpose of screwing the faucet into the cask, as well as of screwing the ferrule D onto shank A. The body portion of the ferrule is of larger diameter than the tapering threaded portion, and between the two parts there is a shoulder, $b$, which, when the faucet is in position, comes in contact with the outside of the cask, as shown, and serves to make the faucet more rigid and less liable to work loose. The interior of the ferrule is in part threaded and in part smooth, the threaded portion extending sufficiently to secure the ferrule firmly to the wood, while the smooth end of the wooden barrel or shank A is carried to the inner end of the ferrule, so as to form a lining thereto and keep the liquor from contact therewith. By this construction a very strong and inexpensive faucet is produced, which does not injure the liquor, and which, when set in a thin cask, will maintain its position firmly so long as desired. Only a small portion, if any, of the metal tip D is exposed to the liquor, and that portion may be easily and cheaply protected by nickel-plating.

What I claim is—

A faucet having a wooden body or barrel, combined with a tapering internally and externally threaded metallic ferrule or tip rigidly attached to the said body or barrel and provided with a squared portion, $a$, adapted to receive a wrench, and with a shoulder, $b$, for contact with the outside of the cask, the inner end of the said body or barrel extending to the inner end of the said ferrule, and thus forming a lining for the same, all substantially as and for the purpose set forth.

JOHN DEASEY.

Witnesses:
WM. A. MACLEOD,
ROBERT WALLACE.